United States Patent [19]
Karas

[11] 3,965,916
[45] June 29, 1976

[54] APPARATUS AND METHOD FOR GAGGING A RELIEF VALVE WITHIN A FLUE SECURED TO A TANK

[75] Inventor: Gus Karas, Concord, Calif.

[73] Assignee: Chevron Research Company, San Francisco, Calif.

[22] Filed: Dec. 23, 1974

[21] Appl. No.: 535,397

[52] U.S. Cl. .................................. 137/15; 137/541; 137/384.6; 251/82; 251/291
[51] Int. Cl.² ........................................ F16K 15/18
[58] Field of Search .......... 137/541, 522, 587, 339, 137/384, 384.6, 1, 15, 316, 382.5; 251/82, 90, 291, 285, 187

[56] References Cited
UNITED STATES PATENTS

| | | | |
|---|---|---|---|
| 1,753,024 | 4/1930 | Rode | 251/291 X |
| 2,278,437 | 4/1942 | Gentzel | 137/522 X |
| 2,608,992 | 9/1952 | Folmsbee et al. | 137/541 |
| 2,853,094 | 9/1958 | Wexler | 251/90 X |

Primary Examiner—William R. Cline
Attorney, Agent, or Firm—Ralph L. Freeland; Robert T. Kloeppel

[57] ABSTRACT

An apparatus for stopping the flow of gas under pressure from a relief valve comprises an elongated tube which fits around a flue secured to a tank. The apparatus has means for maintaining the tube in this position. An elongated rod is extended through the tube and secured into a load-transferring position so that it rests on the pressure valve assembly, thus preventing the assembly from opening.

The method for sealing off a leaky safety valve has a first step of placing a tube over a flue for a safety valve. This tube has a bar adjustably secured within and generally coaxial with it. The bar is lowered until it sits on the valve head so as to restrain the valve from leaking.

4 Claims, 3 Drawing Figures

APPARATUS AND METHOD FOR GAGGING A RELIEF VALVE WITHIN A FLUE SECURED TO A TANK

BACKGROUND OF THE INVENTION

1. Field of the Invention

This invention relates to a method and apparatus for abating emissions to the atmosphere from a leaking pressure relief valve secured to a pressurized container, such as a railroad tank car.

2. Description of the Prior Art

Inflammable gases like butane and propane and corrosive gases as anhydrous ammonia, chloride, and chlorine are stored for various reasons in movable or stationary containers and tanks. They are ordinarily held under pressure within the containers to more conveniently store them in a volume smaller than they would occupy without pressure. The exact amount of pressure in the tanks, however, must be maintained even though the surrounding temperatures within and around the tank vary. For example, the temperatures may vary as with a railroad tank car between 140°F and as low as −50°F, as it moves through the United States. Industry ordinarily achieves pressure control within the tanks by using safety relief valves.

The valves commonly used are ordinarily efficient, safe and reliable; nevertheless, on occasion they do develop leaks. This problem becomes especially significant when a container having a leaky valve is near populated areas like railroad sidings near factory and residential areas, for the leak may become the source of an explosion or air pollution. In some cases both of these events may occur together.

A typical safety valve is reciprocal within a cylinder or body. The reciprocal motion of the valve head and stem is responsive to pressure changes in the tank. In the normal position the upper expanded or flanged head is held in position by an elastic or resilient means, such as a helical spring. When a pressure increase has occurred, however, this upper end or head will move away from its seat so that the tank's contents can escape.

On occasion, however, the valve head may develop a leak because of:
improper valve head reseating
spring failure
structural deterioration of the valve seat
obstructions like corrosion or dirt on the valve seat or stem that prevents proper valve functioning of the valve assembly. Obviously, these situations are undesirable since a leak may lead to a damaging explosion or environmental pollution.

The present invention will set forth a method and apparatus for gagging a valve (stopping a valve from leaking). In applying the invention, an easier, quicker way of stopping a valve leak than the currently used method of replacing or repairing a leaky valve on the spot results.

SUMMARY OF THE INVENTION

The present invention comprises an apparatus to gag a safety relief valve assembly. A method is also disclosed for this purpose.

Concisely, the apparatus includes an elongated cylindrical body removably secured into a load-transferring position. An elongated structural member is adjustably extended through this elongated body to a load-transferring position against the upper head of the valve assembly. Consequently, the cylindrical body and structural member gags the valve assembly either by preventing movement of the spring restrained upper end from moving off its seat or by pushing the valve head against the seat if the spring cannot.

The method involves the steps of placing the structural tube around the flue which circumscribes the valve assembly, adjusting the structural bar or member until it is aligned with the upper head of the assembly, and lowering the bar until it sits on this head. Upon completion of these steps the assembly is restrained from leaking because the upper valve head is prevented from moving off its valve seat.

DESCRIPTION OF THE PREFERRED EMBODIMENT

Figure 1:
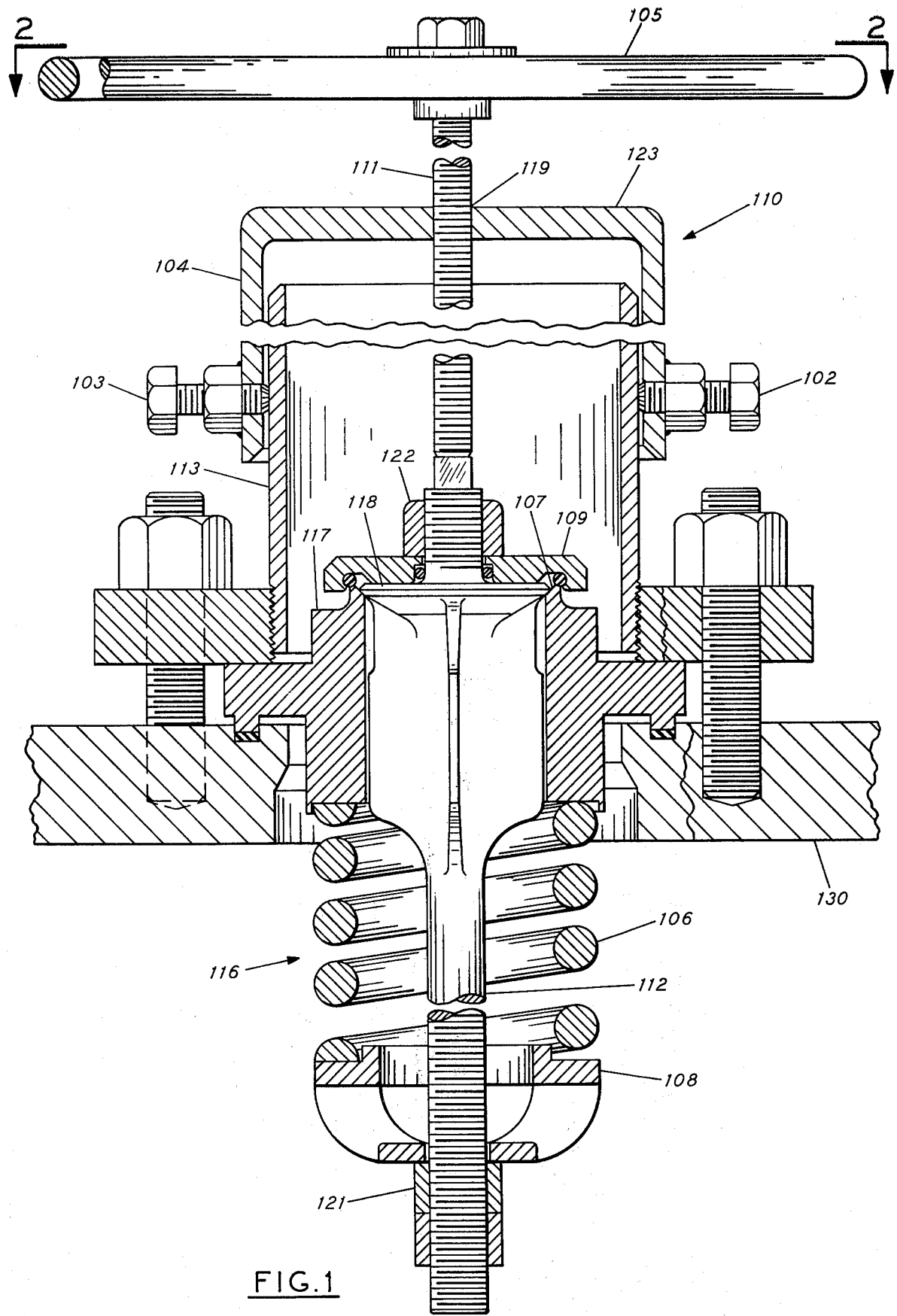
FIG. 1 is a vertical cross-section that illustrates a reciprocal safety valve having a flue fastened to a tank cover or lid. The apparatus of the present invention is shown in a coaxial position to the flue and in a load-transferring position against the safety valve.
Figure 2:
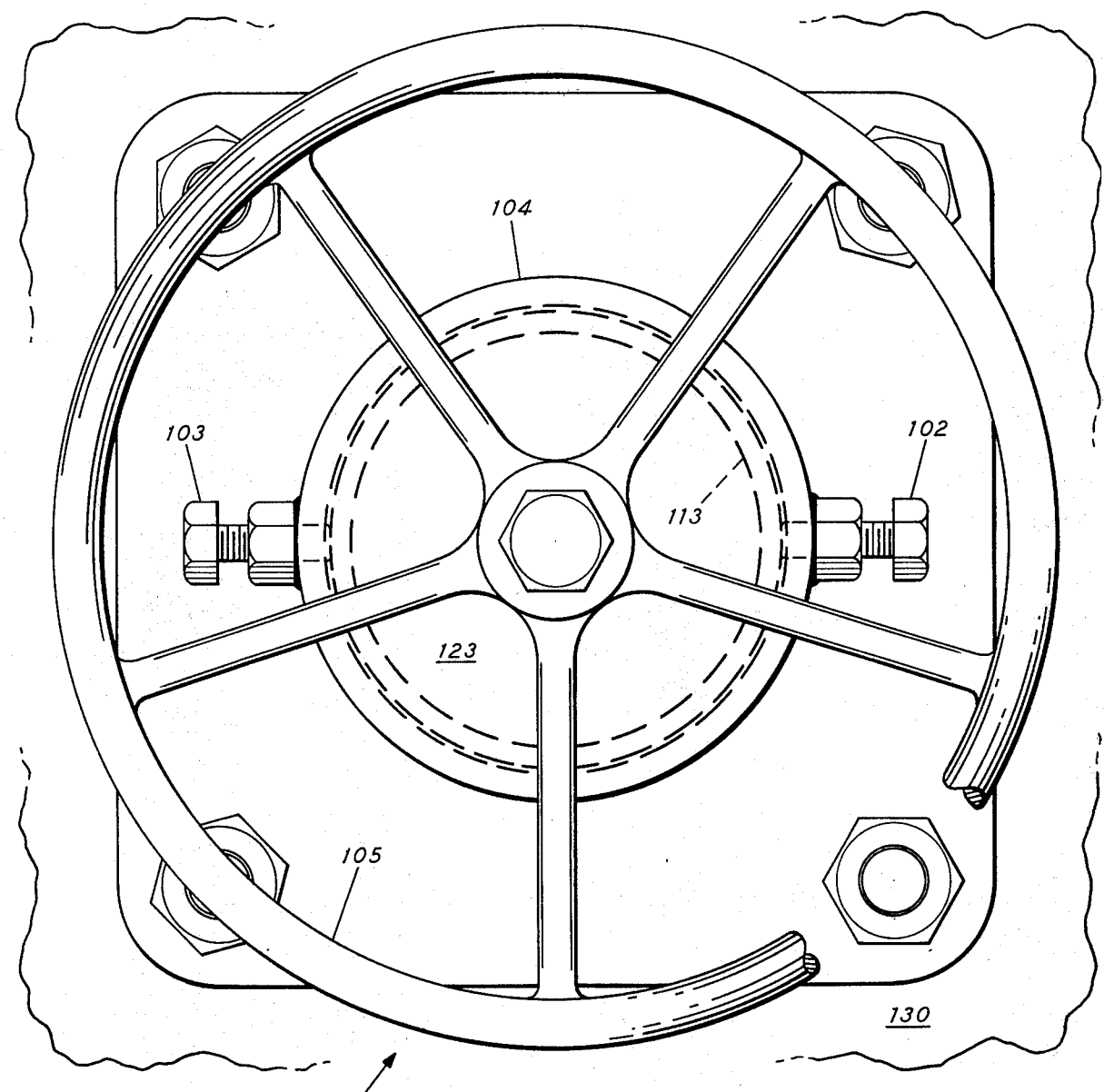
FIG. 2 schematically illustrates the present invention in plan view.

A composite of the apparatus of the present invention and a safety valve secured to a pressurized container lid 130 is shown in FIG. 1.

A safety valve assembly 116, characterized by a limited range of opening and closing pressure, is positioned in an extended, hollow, and open-ended body 117. This body passes through a tank lid 130 so that when the valve assembly is in an open position due to an abnormal pressure in the tank the gaseous contents of the tank escapes. The valve assembly illustrated--one of several available (see U.S. Pat. Nos. 1,774,690, 2,072,271, 2,290,038, 2,519,358, 2,599,622, 2,608,992, 2,834,374, 2,854,021, 3,008,485)—has a stem or rod 112 extending from a flanged valve bottom or lower valve 108.

In the illustrated view, the flanged bottom or lower valve head 108 is held a predetermined distance from the lower end of the hollow body 117 by resilient or elastic means such as spring 106. The spring is coaxial with stem or valve rod 112 and held into position at the lower end of the valve assembly by lower head 108 and retaining means 121. At the valve's upper end, it is held in place by upper head 109 and retaining means 122. After appropriate adjustment the spring allows the valve head 118 to open and close against seat 107 at given pressures. The elastic means, the stem, and the upper and lower valve heads are substantially all of the portion of the safety valve that moves under a pressure increase to vent the gaseous content of the tank to reduce the pressure within the tank.

Note that this assembly may be also described as a dual valve assembly where the first valve is the upper head and the second valve is the lower head.

The present invention for gagging a leaky valve assembly has an elongated cylindrical means, such as structural tube 104, located concentrically with a flue 113 circumscribing valve 116. After this tube is secured to the flue 113 by set screws 102 and 103, a structural member like an elongated rod 111 is axially extended through the tubular means 104 by rotating or adjusting means. The adjusting means may be a hand wheel 105 connected to the upper end of rod 111. Thus by turning hand wheel 105 the threaded portion 119 of the rod is screwed into the top 123 of tubular means 104 and the structural means 111 is lowered into or raised from a load transferring position. These elements comprise the valve gagging apparatus 110.

Figure 3:
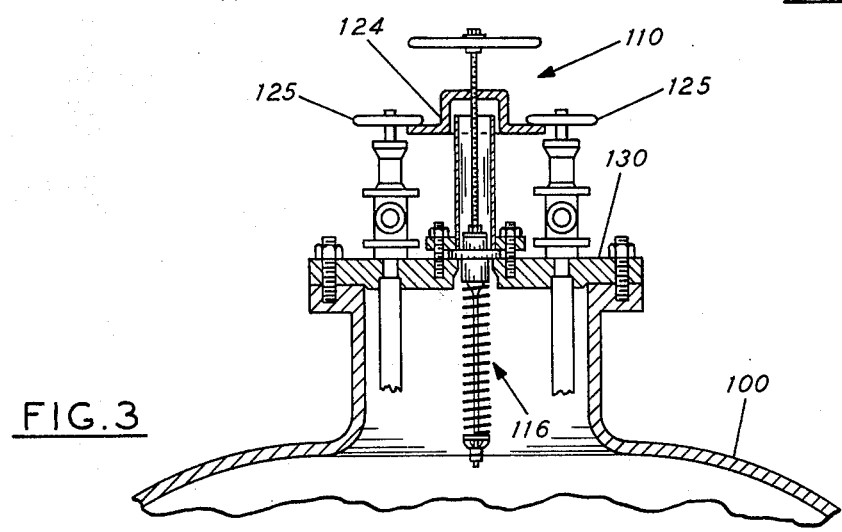
FIG. 3 schematically illustrates the present invention maintained in a load transferring position by brackets located against the underside of adjacent valve handles. The illustrated arrangement is similar to that found on railroad tank cars.

The apparatus 110 is utilized by first placing the structural tube 104 around the flue 113 and then securing it in this position by the maintaining means, set screws 103 and 102. Alternatively, this means may be brackets 124 wedged underneath adjacent valve handles 125 of conventional inlet and outlet valves secured to the tank, as shown in FIG. 3. A vertical force exerted by the bar 111 against the valve head is transferred from the tube 104 to the flue 113 and then into the tank to which the flue is secured.

The vertical force is developed as the bar 111 is moved against the upper end of valve assembly 116. With the bar 111 exerting force against the valve 116 greater than the force resulting from the pressure within the tank 100, the spring loaded upper valve and stem are unable to reciprocate or move within the extended open-ended body 117.

Concisely, then, the present invention is a means for gagging a safety valve secured to a container under pressure. And, although only selected embodiments of the present invention have been described in detail, the invention is not to be limited to any specific embodiments, but rather only by the scope of the appended claims.

WHAT IS CLAIMED IS:

1. Method for the purpose of sealing a leaky safety valve assembly in a tank containing gas under pressure, said assembly characterized by
    an extended, hollow, and open-ended body passing through said tank so that one end opens into the interior of said tank and the other end opens into an environment exterior to said tank, said body attached to said tank;
    a safety valve assembly reciprocable within said body due to pressure changes in said tank, said assembly having an expanded lower valve head;
    a stem extending from said lower valve head and having an upper valve head, said upper valve head spaced a predetermined distance from said lower valve head;
    a valve seat connected to said open-ended body, said seat cooperating with said upper head to close said open-ended body when said upper head is placed against said seat;
    resilient means for keeping said upper head against said seat in a normally closed position, said resilient means located coaxial with said stem and between said lower valve head and said open-ended body;
    a flue circumscribing said valve assembly and fixed to the exterior of said tank;
said method comprising the steps of:
    placing over said flue a structural tube having a bar adjustably secured to and generally coaxial with said tube;
    securing said tube to said tank in order to achieve a load-transferring position for said bar;
    adjusting said bar until the lower end thereof is in alignment with the upper head of said safety valve; and
    lowering said bar until said bar sits on said head to restrain said valve assembly from leaking by preventing said spring loaded upper head and stem from reciprocating within said body under a pressure change.

2. A method for the purpose of sealing a leaky valve assembly in a tank containing gas under pressure of Claim 1 wherein said tube has brackets fastened to said tube and wherein the step of securing said tube is characterized by turning said tube about said flue so that said brackets wedge underneath adjacent valve handles of valves secured to said tank.

3. An apparatus for sealing a valve structure secured to a pressurized container, said valve structure having
    an extended, hollow, and open-ended body secured to said container so as to provide an opening through the wall of said container;
    a dual valve assembly movable within said open-ended body, said assembly having a first upper and a second lower valve;
    a means for sealing said upper valve against the upper end of said open-ended body to prevent a fluid within said tank from escaping;
    elastic means for keeping said second valve in a spaced relationship from the lower end of said open-ended body whereby said means and said second valve moves upwardly when said first valve moves upwardly; and
    a flue circumscribing said open-ended body, said flue being secured to the exterior of said pressurized tank, said apparatus comprising:
    an elongated tubular means for fitting over said flue;
    a means for maintaining said tubular means in a concentric position with said flue;
    an elongated rod which is axially extended through said tubular means; and
    a means for moving said elongated rod into a position so that said rod rests on said pressure relief valve assembly within said flue so that said rod keeps said assembly from opening until said apparatus is removed from said first valve.

4. A means for preventing a safety valve from leaking, said valve being secured to a pressurized gas tank whereby a portion of said valve moves under a pressure increase within said tank to vent said gas to reduce pressure within said tank, and further, said valve being surrounded by a flue, said means comprising:
    elongated cylindrical means suitable for circumscribing the outer perimeter of said flue which surrounds said safety valve;
    means for keeping said cylindrical means concentric in said flue;
    an elongated structural member adjustably secured within said cylindrical means; and
    means for holding said elongated structural member in a position whereby the lower end of said structural means is located in a load-transferring relationship against the movable portion of said safety valve so that a vertical force exerted through the structural member keeps said safety valve from opening.

* * * * *